E. A. LARSON.
SPEEDOMETER DRIVE GEAR.
APPLICATION FILED MAY 17, 1913.
1,182,022.
Patented May 9, 1916.
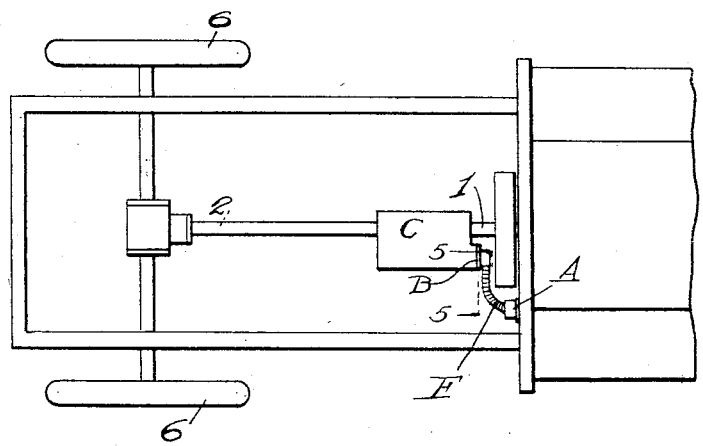
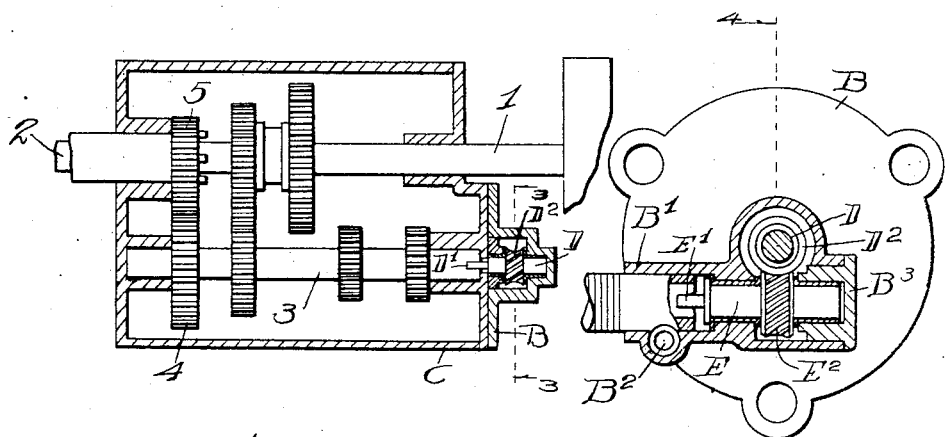
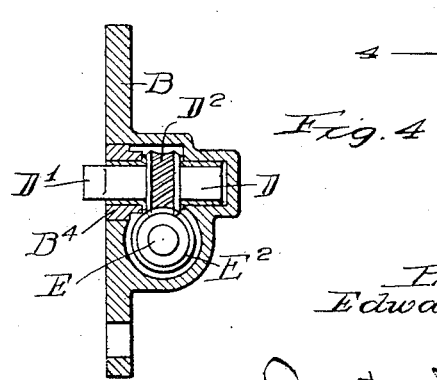
Inventor
Edward A. Larson.

UNITED STATES PATENT OFFICE.

EDWARD A. LARSON, OF CHICAGO, ILLINOIS, ASSIGNOR TO STEWART-WARNER SPEEDOMETER CORPORATION, OF CHICAGO, ILLINOIS, A CORPORATION OF VIRGINIA.

SPEEDOMETER-DRIVE GEAR.

1,182,022.  Specification of Letters Patent.  Patented May 9, 1916.

Application filed May 17, 1913. Serial No. 768,259.

*To all whom it may concern:*

Be it known that I, EDWARD A. LARSON, a citizen of the United States, residing at Chicago, in the county of Cook and State of Illinois, have invented new and useful Improvements in Speedometer-Drive Gear, of which the following is a specification, reference being had to the accompanying drawings, forming a part thereof.

The purpose of this invention is to provide simple and efficient gearing for transmitting rotation proportional to the speed of the road wheels of a motor vehicle to a speedometer or other travel-indicating device mounted in any convenient position upon the vehicle, preferably on the dashboard.

The invention consists of the features and elements described and shown in the drawings as more particularly indicated in the claims.

In the drawings:—Figure 1 is a partial plan view of an automobile chassis showing the drive gear installed thereon. Fig. 2 is a detail view showing the transmission gear of the vehicle and the speedometer drive device applied thereto. Fig. 3 is an enlarged detail section taken as indicated at line 3—3 on Fig. 2. Fig. 4 is a section taken as indicated at line 4—4 on Fig. 3. Fig. 5 is a detail elevation looking in the direction of the arrows 5—5 on Fig. 1.

In most motor vehicles the speed-change gearing through which the ratio of the engine speed to the road wheel speed is varied contains an element whose rotation bears a fixed relation to the rotation of such road wheels, and the present device is designed to connect a speedometer or other travel-indicating device with such an element in the transmission train. As detailed in Fig. 2, the transmission selected for illustrative purposes comprises the engine shaft, 1, the propeller shaft, 2, which is permanently coupled with the road wheels, and a side shaft or counter shaft, 3, through which the rotation of the engine shaft, 1, is transmitted to the propeller shaft, 2, in a well understood manner through spur gears, except in the case of "direct drive;" and at all times, even in this latter case the counter shaft, 3, is rotatively connected with the propeller shaft, 2, by a pair of gears, 4 and 5. The speed of its rotation consequently bears a fixed relation to the rotation of the road wheels, 6, 6, and this counter shaft, 3, is, therefore, a convenient element from which to derive motion for the speedometer, A, for purposes of speed measurement and indication.

The present device consists of a pad-like gear housing, B, designed to fit exteriorly upon the end of the transmission housing, C, with the projecting tang, D¹, of the shaft, D, engaged in a slot diametrically cut across the end of the counter shaft, 3. A spiral gear, D², on the shaft, D, transmits the rotation thus obtained to a spiral gear, E², on a transversely extending shaft, E, which is provided at one end with a terminal tang, E¹, through which it may be coupled with a standard flexible or jointed shaft such as indicated at F, and extending to the speedometer, A. By this construction the drive gears, D² and E², are embodied in a practically unitary fitting which may be applied to the transmission housing, C, with a minimum of labor, and without in any manner opening either of the two devices which are connected; viz., the housing, C, and the pad, B, and connected casing of the flexible shaft, F, both of these members, as will be understood, being constructed so as to be filled, and being filled as a part of the process of construction, with a lubricant which is prevented from escaping, because the said members, respectively, have no openings except those through which the shafts protrude and which are closed by such protruding shafts. This results in a very compact arrangement of the speedometer driving means; and as indicated in Fig. 5 this arrangement requires little more than a single bend in the flexible shaft, F. Preferably the gear housing, B, includes the split socket, B¹, and clamp screw, B², by which the end of the housing F¹ of the flexible shaft, F, may be secured. As indicated in Figs. 3 and 4, the gear housing, B, embodies in a single casting the chamber for the gears, D² and E², being supplemented merely by two plugs, B³ and B⁴, which are provided for convenience in assembling and are preferably made as driving fits in the casting, so as to be permanently forced into place when the device is made up.

I claim:—

1. In a motor vehicle, in combination, a transmission gearing comprising a casing and a gear train therein having a shaft exposed for engagement through an exterior wall of the casing; a housing for a supplemental gear train, and a train therein comprising a shaft which protrudes from the housing, and a second shaft which is exposed for engagement through an exterior wall of the housing, said casing and housing having the exterior surfaces of their respective walls around the axes of said respectively exposed shafts, matched to seat one upon the other, said exposed shafts being matched for engagement one with the other when said walls are so seated one upon the other.

2. In a motor vehicle, in combination, a transmission gearing comprising a casing, and a gear train therein having a shaft which terminates in an exterior wall of the casing; a housing for a supplemental gear train which comprises a shaft protruding from the housing, and a second shaft which protrudes through an exterior wall of the housing, the exterior surfaces of said casing and housing encompassing the axes of the shafts terminating in and protruding from them respectively being matched for seating one upon the other, the wall of the casing being apertured to admit the end of the shaft protruding from the housing, and the said shafts being matched for driving engagement with each other when said casing and housing are matched one upon the other.

In testimony whereof I have hereunto set my hand at Chicago, Illinois, this 14 day of May, 1913.

EDWARD A. LARSON.

Witnesses:
C. P. SMITH,
S. HUDSON.